United States Patent [19]
McMahon

[11] 3,968,475
[45] July 6, 1976

[54] DIGITAL PROCESSOR FOR EXTRACTING DATA FROM A BINARY IMAGE

[75] Inventor: Donald H. McMahon, Carlisle, Mass.

[73] Assignee: Sperry Rand Corporation, New York, N.Y.

[22] Filed: Nov. 11, 1974

[21] Appl. No.: 522,666

[52] U.S. Cl. .............. 340/146.3 E; 340/146.3 WD; 340/146.3 Y
[51] Int. Cl.² ......................................... G06K 9/12
[58] Field of Search .............. 340/146.3 E, 146.3 J, 340/146.3 Y, 146.3 WD

[56] References Cited
UNITED STATES PATENTS

| | | | |
|---|---|---|---|
| 3,297,993 | 1/1967 | Clapper | 340/146.3 J |
| 3,305,835 | 2/1967 | Beltz | 340/146.3 J |
| 3,699,519 | 10/1972 | Campbell | 340/146.3 E |
| 3,771,127 | 11/1973 | Van Heddegem | 340/146.3 J |

*Primary Examiner*—Joseph M. Thesz
*Attorney, Agent, or Firm*—Howard P. Terry; Seymour Levine

[57] ABSTRACT

A digital processor for extracting data from a binary image in which the image is divided into an array of sample areas, each sample area containing an array of binary data spaces. Patterns formed by adjacent data spaces within the sample sample represent local line orientations from which the image characteristics are determined. Sample areas linearly arrayed in the direction in which the image is scanned are simultaneously processed to extract the line orientation information contained therein.

7 Claims, 6 Drawing Figures

A OUTPUT 0°

B OUTPUT 45°

C OUTPUT 90°

D OUTPUT 135°

0°

45°

90°

135°

| SCANS | 0 | 1 | 2 | |
|---|---|---|---|---|
| 0 | 512 | 1024 | 1536 |
| 1 | 513 | 1025 | | |
| 2 | 514 | 1026 | | |
| 509 | 1021 | 1533 | | |
| 510 | 1022 | 1534 | | |
| 511 | 1023 | 1535 | | |

DIGITAL PROCESSOR FOR EXTRACTING DATA FROM A BINARY IMAGE

BACKGROUND OF THE INVENTION

1. Field of the Invention

This invention relates generally to digital processing for pattern or character recognition and more particularly to digital processing for automatic fingerprint identification.

2. Description of the Prior Art

There has been considerable recent interest in the field of automatic fingerprint identification. Generally, this interest has been in an area of optical processing in which a variety of devices and methods have been disclosed. Mainly, these techniques employ match filtering or cross-correlation for direct comparison of the image of the fingerprint to be identified with that of a prerecorded fingerprint image, or for the comparison between the Fourier transform of the image of the fingerprint to be identified and a prerecorded Fourier transform representative of the fingerprint. More sophisticated devices compare certain details of the input fingerprint with prerecorded fingerprint data, for instance, the location of ridge line endings, or the slope or spacing of ridge lines in one region relative to the slope or spacing of the lines in another region. U.S. Pat. No. 3,771,124, issued Nov. 6, 1973 and U.S. Pat. No. 3,771,129, issued Nov. 6, 1973, both in the name of the instant inventor and assigned to the same assignee, are in this general category. The former discloses a coherent type optical processor wherein the fingerprint ridge line orientations are inspected in a plurality of preselected finite areas of the fingerprint by means of a rotating spatial slit filter, disposed in the Fourier transform plane of an optical processor for sequentially transmitting distinct components of the Fourier transform to the image plane of the processor where a plurality of photodetectors are located each corresponding to a discrete sample area. The time delay between a reference orientation of the slit filter and the occurrence of peak light at each detector, which is representative of the ridge orientation in the sample area of the fingerprint, is noted and proportional analog or digital representation thereof is generated for storage and subsequent comparison with similarly obtained signals representative of fingerprints presented for identification. The latter discloses an incoherent optical processor wherein fingerprint ridge line orientations are inspected in a plurality of preselected finite sample areas of the fingerprint by means of a rotating grating which transmits maximum light to a detector, corresponding to a given sample area, when the grating is in spatial alignment with the ridge lines of the related sample area of the fingerprint. The time interval between a reference orientation and the instant of maximum light at each detector determines the ridge line orientation for the detector's sample area. These patents disclose devices for measuring the single most discriminating feature of all fingerprint patterns, the angular orientation of the friction skin ridges as a function of position on the pattern. To perform these measurements both techniques require a rapidly rotating element to perform specialized filtering functions for the determination of ridge orientation.

As opposed to techniques which use optical processing to generate ridge orientation and ridge spacing measurements directly, the present invention provides a digital processing technique by which ridge orientation and ridge spacing can be determined from a binary image of the fingerprint, thus eliminating the need for rapidly rotating elements. It will be apparent to those skilled in the art, that although the invention is described herein with reference to fingerprint analysis for identification, it is also applicable to pattern or character recognition in that line orientation and density in sample areas, of figures to be recognized, can form the basis for identification.

SUMMARY OF THE INVENTION

The subject invention is a digital processing technique for deriving both ridge line angle measurements and ridge line spacing measurements from a binary image of a fingerprint pattern. The binary image may be formed by scanning a laser beam, the beam width of which is equivalent to a data space, across a fingerprint card in a raster scan fashion. The detection of the ridge line on the fingerprint card being denoted as a one in the appropriate data space (a shaded data space) and the lack of a ridge line being denoted as a zero (an unshaded data space). The binary image of the fingerprint so formed may consist of a 512 × 512 array of data spaces, each containing a one or a zero. Thus, the number of data bits recorded and possibly stored for processing is 262,144. One could, in principal, store this amount of information in a computer memory and subsequently process this data to obtain a digital classification, representative of the fingerprint pattern. A computer memory of 16,384 16 bit words would then be required. This binary image pattern is not appropriate for the purposes of correlation for the following reasons: (1) the large amount of available data would require an excessive length of processing time, and (2) the fine grain binary image stored data includes the effects of pressure distortions which would effectively prevent the matching of entire patterns. It is therefore required to provide a procedure which converts the fine grain binary image of the fingerprint pattern into a coarser grained set of measurements representing the ridge line orientation of the friction skin as a function of position.

According to this invention, the original 16,384 16 bit words of image data are converted into a two dimensional 32 × 32 array of sample areas, each containing four eight bit words from which ridge angle and ridge spacing measurements can be derived. Thus, ridge angle and ridge spacing data are retained and the amount of data which must be stored, and subsequently processed, is reduced by a factor of eight. Moreover, the use of a hardwired processor to effect this data condensation, as described herein, eliminates the need for approximately 16,000 words of computer core storage.

The data reduction procedure consists of initially reducing the 512 × 512 array of data spaces of a fingerprint into a 32 × 32 array of sample areas consisting of 16 × 16 data spaces. Each sample area is decomposed into sample spaces consisting of 2 × 2 squares of binary data spaces and contains an array of 16 × 16 overlapping sample spaces. The shaded pattern of each of the sample spaces either corresponds to one of eight selected patterns representing one of four quantized ridge orientations or to none of them. If there is no correspondence, the pattern of the sample space is disregarded. A count of sample spaces corresponding to each of the four angles is accumulated to determine a vector length at each angle. These four vectors are then added or subtracted to maximize the resulting total vector. The slope of the resulting vector represents the average ridge orientation in the sample area and its length is representative of the number of lines contained therein.

DESCRIPTION OF THE PREFERRED EMBODIMENTS

Figure 1:
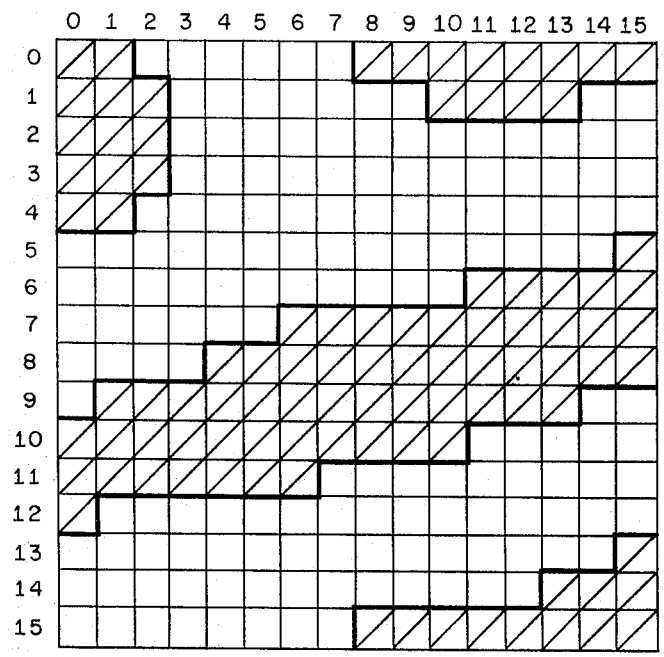
FIG. 1 illustrates a typical sample area of a binary image of a fingerprint pattern.
Figure 3:
FIG. 3 shows the sample space patterns selected for tabulation.
Figure 3:
Figure 3:
Figure 3:
Figure 3:
Figure 3:
Figure 3:
Figure 3:
Figure 2:
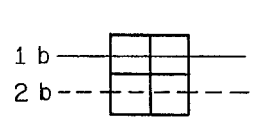
FIG. 2 illustrates the possible sample space patterns for the quantized angles and their method of derivation.
Figure 2:
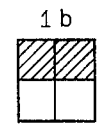
Figure 2:
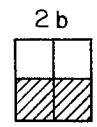
Figure 2:
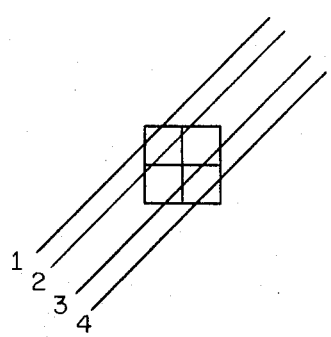
Figure 2:
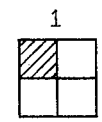
Figure 2:
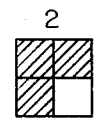
Figure 2:
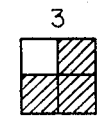
Figure 2:
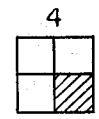
Figure 2:
Figure 2:
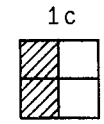
Figure 2:
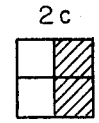
Figure 2:
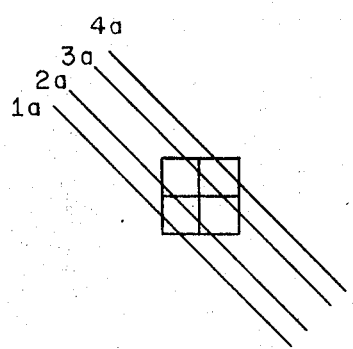
Figure 2:
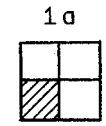
Figure 2:
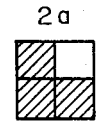
Figure 2:
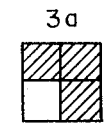
Figure 2:
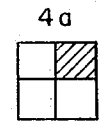

FIG. 1 is a typical sample area of a 16 × 16 array of data spaces, with the shaded areas in the figure corresponding to ridge lines and the unshaded areas corresponding to ridge line spaces. The 16 × 16 array is decomposed into sample spaces consisting of 2 × 2 squares of binary data spaces, of which there are $2^4 = 16$, possible combinations of shaded and unshaded data spaces. Of the 16, 12, shown in FIG. 2, can be utilized to unambiguously represent the four angles of 0°, 45°, 90° and 135°. Of the 12 information possibilities, only the eight shown in FIG. 3 are selected for the purposes of measurement, though other sets could have been chosen with equal validity.

Sample spaces, within each sample area, are determined by combining adjacent rows and columns in an overlapping fashion. For example, the number of sample spaces contained within column 0 and column 1, of FIG. 1 is 15. The first sample space is formed by taking the first two data spaces in row 0: (0, 0) and (0, 1) with the first two data spaces in row 1: (1, 0) and (1, 1). The second 2 × 2 sample space is formed by taking the first two spaces in row 1: (1, 0) and (1, 1) with the first two data spaces in row 2: (2, 0) and (2, 1) and so on throughout columns 0 and 1. This overlapping of sample spaces is also performed with respect to the data space columns. Thus, the next two columns to be considered are column 1 and column 2 and in the manner just described, fifteen sample spaces are also determined for each pair of rows. Thus, by allowing overlapping of sample areas, the 16 × 16 data spaces comprising a sample area give rise to an array of 16 × 16 sample spaces.

Figures 4, 6:
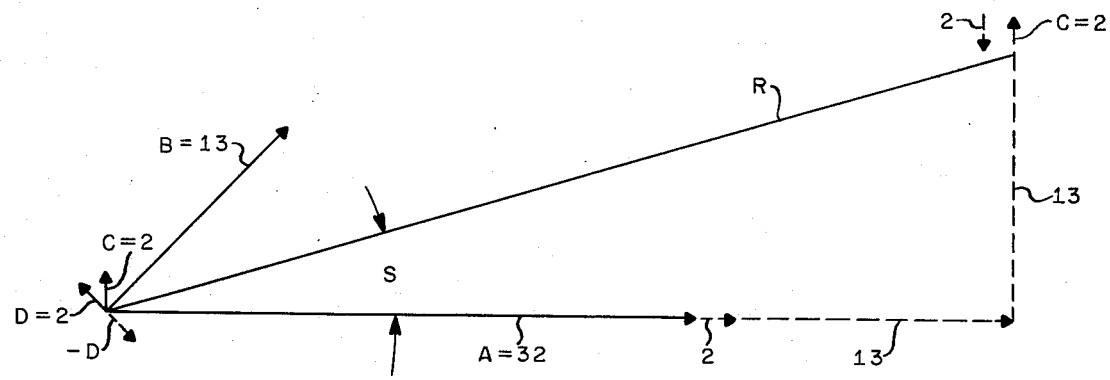
FIG. 4 is a vector representation and summation of the angular ridge angle data contained in FIG. 1.
FIG. 6 illustrates the data space numbering and scan sequence employed in scanning a binary image of a fingerprint.

An examination of FIG. 1 in this manner reveals that there are 32, 13, 2 and 2 sample spaces corresponding to the angles 0°, 45°, 90° and 135°, respectively. This information is represented vectorially in FIG. 4. The length of the vectors B and D corresponding to 45° and 135° are shown in FIG. 4 as the actual count of the selected representative sample spaces. Each count represents a diagonal in a 2 × 2 sample space which contains components consisting of one horizontal and one vertical count. This allows the direct count of the selected sample space patterns for 45° and 135° to be utilized for both the horizontal and vertical components of these vectors. These counts are added or subtracted to the counts of the sample space patterns corresponding to 0°, vector A in FIG. 4, and to 90°, vector C therein, to maximize the length of the resultant vector. The slope of the resultant vector, represents the average ridge orientation within the sample area and its length R divided by the length of the sample area (number of data spaces in one dimension) provides a measure of the number of ridge lines contained therein. Since the ridge line angle orientations repeat after 180°, the slope of the resultant vector is chosen to lie within the range of 0° to 180°.

While all of the above steps can readily be carried out by a software program, the core storage requirement would be approximately 16,000 words. Therefore, it would be desirable to implement a hardwired electronics version to perform the required data reduction.

Figure 5:
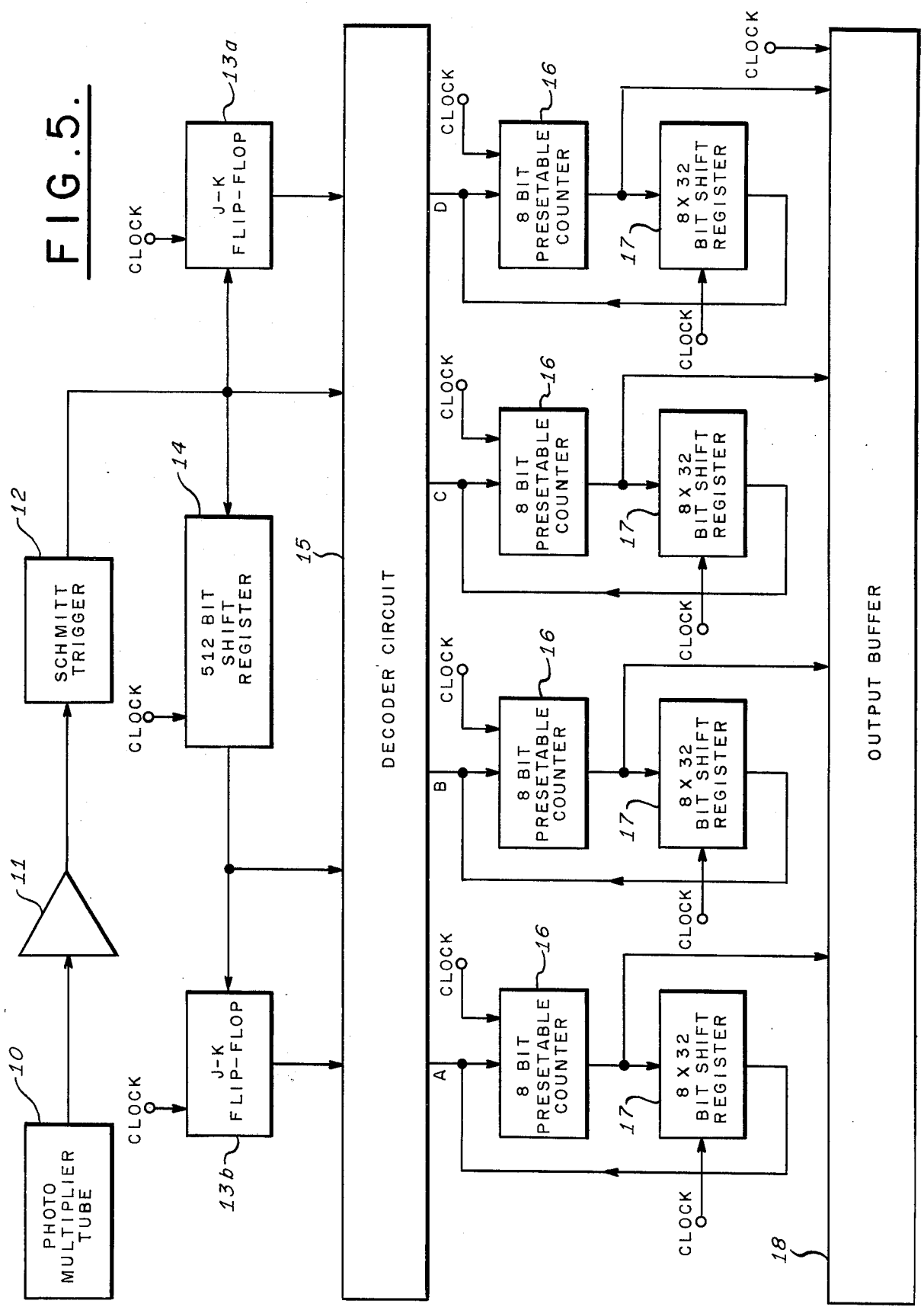
FIG. 5 is a simplified schematic of an apparatus embodying the principles of the present invention.

A block diagram of the essential parts of the system needed to condense the binary image data to ridge angle and spacing data is shown in FIG. 5. A digitized representation of the fingerprint may be scanned by using a linear, mechanical motion transport in one direction, not shown in the figure, and scanning with a laser beam in the other direction, also not shown. The photomultiplier tube 10 detects transmitted light through the digitized representation of the fingerprint. The output of the photomultiplier 10 is fed to an amplifier 11 which feeds a Schmitt trigger 12.

The output of the Schmitt trigger 12 is fed to the input of shift register 14, the input of a J-K flip-flop 13a and to a decoder circuit 15. In turn, the output of the J-K flip-flop 13a is fed to the decoder circuit 15 and the output of the shift register 14 is fed to the decoder circuit 15 and to the input of a second J-K flip-flop 13b, the output of which is fed to the decoder circuit 15. Decoder circuit 15 outputs are fed to four presettable counters 16, the outputs of which are fed to four shift registers 17, which with the presettable counter 16 comprise a counting circuit, and to an output buffer for transmission to a digital computer. Shift registers 17 outputs are fed to the inputs of the presettable counters 16.

The first object of the electronics is to recognize the presence of the individual 2 × 2 sample space patterns which indicate the four elemental quantized angular directions. Because the fingerprint is scanned a line at a time, it is necessary to retain in memory sufficient data to reconstruct the sample space patterns. In effect, the binary information of the previous scan line must be stored locally. This is conveniently accomplished by the 512 bit shift register 14. Since the optics and the photomultiplier 10, amplifier 11, and Schmitt trigger 12 combination generate a data stream of binary ONES or ZEROES at a given clock rate in synchronization with the scanning process, the shift register must advance one bit at this same clock rate. Assuming a vertical scan rate of 512 data spaces per scan line, the data bits separated by 512·clock pulses represent neighboring data spaces which lie at the same height on adjacent scan lines. This is shown in FIG. 6 in which the data spaces numbering, scan sequence and scan direction are shown. Thus, by counting data by clock pulses from the input, as indicated in FIG. 6, it is evident that the 0, 1, 512 and 513 inputs form a 2 × 2 sample space of binary data which can be readily recorded, and decoded to none or one of the eight pattern types shown in FIG. 3, and one of the four possible quantized angle measurements.

Referring to FIG. 5, when the scanning of the digital image of the fingerprint commences, the shift register 14 and J–K flip-flops 13a and 13b are clear. During scan zero, the binary data contained in data spaces 0 thru 511 (FIG. 6) are clocked into the shift register 14. During this time, the decoder is inhibited. At the commencement of scan 1, the 0 data space binary data is at the output of the shift register 14, the 511 data space binary data is at the input of the shift register 14, clocked into J–K flip-flop 13a and available to the decoder circuit 15 and the 510th data space binary data has been clocked out of J–K flip-flop 13a and available to the decoder circuit 15. As scan 1 continues, data from data space 512 is clocked into the shift register 14, the J–K flip-flop 13a and available to the decoder circuit 15, simultaneously the data from data space 0 is clocked out of shift register 14 and into J–K flip-flop 13b and is available to decoder circuit 15 and the data from data space 511 is clocked out of J–K flip-flop 13a and is available to decoder circuit 15. At this time binary data from data spaces 0, 511 and 512, are available to decoder circuit 15. The shift register 14 contains the data of data spaces 1 thru 512, J–K flip-flop 13a contains the data of data space 512 and J–K flip-flop 13b contains the data of data space 0. Since 0, 511 and 512 do not define a sample space, the decoder continues to be inhibited. The next clock pulse generated during the scanning process enters the data from data space 513 into shift register 14, J–K flip-flop 13a and is available to decoder circuit 15; clocks out the data of data space 512 from J–K flip-flop 13a and makes it available to decoder 15; clocks out the data of data space 1 from shift register 14 and makes it available to decoder 15 and J–K flip-flop 13b; and clocks out the data of data space 0 from J–K flip-flop 13b and makes it available to decoder circuit 15. The decoder circuit 15 now has available data of data spaces 0, 1, 512 and 513 which define the first sample space in the sample area, the inhibit is removed from the decoder and it begins to operate. The next clock pulse enters the data from data space 514 into the system and data from data spaces 1, 2, 513 and 514, which define the second sample space, into decoder 15 for processing. The process continues until data from data space 1023 is entered into the system and scan 1 is completed. Scan 2 commences with the entry of data from data space 1024 and the processing continues as previously described.

The four possible outputs of the decoder, which can be a 4 line to 16 line demultiplexer chip such as the TI 74154, are designated as A, B, C and D corresponding to 0°, 45°, 90° and 135° respectively, each drive a separate counter which accumulates the total number of counts obtained in each of the 1024 16 × 16 sample areas. While each of the 1024 sample areas of the fingerprint pattern could have four counters associated with it, this procedure is uneconomical and unnecessary. Since data is accumulated simultaneously for 32 continuous sample areas all lying along the scanning direction, it would appear that 128 counter registers would be required for each of the 32 columns of sample areas. If this were the case, these registers would have to be sequentially multiplexed onto a common output bus for transmittal to the computer. It is desirable to reduce the number of counters to avoid the use of non-essential multiplexers. The combination of an eight bit presettable counter 16 and an 8 × 32 bit shift register 17 shown in FIG. 5 reduces the number of required counters to only 4 for a column of 32 sample areas. This combination allows for simultaneous data accumulation for the performance of sequential measurements in the column of sample areas lying along the scan direction.

Consider the necessary circuitry for one of the four counters. For example, that driven by the A angle measurement. Assume that a new scan line has just begun and measurements on a new set of 32 sample areas has commenced. At this time, all shift register 17 bits are set to zero. For the first 16 clock pulses, the presettable counter 16 accumulates a count of the A sample spaces contained therein. After the sixteenth data pulse, the output of counter 16 is sent to the input of shift register 17 and immediately thereafter the output of shift register 17 is transferred to counter 16. Since shift register 17 transfers a null count, counter 16 starts at zero and continues to count the A sample spaces for the next 16 pulses, which correspond to the second sample area. At the conclusion of these 16 pulses, counter 16 has accumulated a count of the A sample spaces in the second sample area for the given scan line. The output of counter 16 is then again shifted to the input of shift register 17 and the output of shift register 17 is sent to counter 16. This procedure continues for the entire 32 sample areas in the column. At the end of each scan line, clock pulses are inhibited until the beginning of the succeeding scan lines. Before the second scan line commences, it is apparent that the previously accumulated total for the first sample area lies at the output of the shift register 17 ready to be transferred to presettable counter 16. When the second scan line is initiated, the output of the shift register is sent to the presettable counter and the previous count in the counter, which corresponds to the last sample area of the previous line, is sent to the shift register. Thus, when the scan line is initiated, presettable counter 16 continues to count upward from the count for the sample area accumulated on the previous scan. In this fashion, the combination shift register 17 and presettable counter 16 accumulates the total number of pulses from the decoder for all 32 sample area during the same time period. After accumulating data for 16 scan lines, the final count for each of the 32 sample areas is contained in the shift register. This data is then sequentially transferred without interrupting the accumulation of data to an output buffer for transmittal to the computer. This circuitry represents an inexpensive hardware approach which eliminates both an excessive number of counters and multiplexers to couple fingerprint ridge angle and ridge spacing data to a common data bus.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A digital processor for extracting data from an image contained within an array of binary data spaces comprising:

means for detecting data contained in each of said binary data spaces and for providing an output representative thereof;

means for storing binary data having an input responsive to said output of said detecting means and providing a plurality of outputs each of which is representative of the binary data in one of said binary data spaces, said outputs and said output of said detecting means collectively representative of a rectangular sample space consisting of data spaces in adjacent rows and columns of said array, said sample space having a configuration that is determined by the binary data of said data spaces comprising said sample space;

decoder means for receiving data from said detecting means and said storage means and providing therefrom data representative of said sample space configuration having a plurality of inputs, one responsive to said output of said detecting means and each of the remaining plurality of inputs responsive to one of said plurality of outputs of said storage means and a plurality of outputs each representative of a predetermined sample space configuration; and plurality of counting means each having an input responsive to one of said plurality of outputs of said decoder means for providing a count of each of said predetermined sample space configuration contained within a predetermined multiplicity of sample spaces, said multiplicity of sample spaces forming a sample area consisting of a predetermined sub-array of data spaces.

2. A digital processor according to claim 1 further including count means responsive to said output of each of said counting means for transmitting data from each of said counting means to an external device wherein said transmitted data is further processed.

3. A digital processor according to claim 1 wherein said storage means comprises:
first means for storing one bit of binary data having an input responsive to said output of said detecting means and an output coupled to one of said plurality of inputs of said decoder means;
second means for storing a multiplicity of bits of binary data having an input responsive to said output of said detector means and an output coupled to one of said plurality of inputs of said decoder means;
third means for storing one bit of binary data having an input responsive to said output of said second storage means and an output coupled to one of said plurality of said inputs of said decoder means whereby said outputs of said first, second and third storage means, together with said output of said detector means form a sample space consisting of a two-by-two sub-array of data spaces in adjacent rows and columns of said array.

4. A digital processor according to claim 1 in which said detector means comprises:
a photomultiplier;
means coupled to said photomultiplier for amplifying a signal received therefrom and providing an output representative thereof; and a Schmitt trigger having an input responsive to said output of said amplifier means and an output which is coupled to said input of said storage means.

5. A digital processor according to claim 1 wherein each of said counting means comprises:
a presettable counter having an input responsive to one of said plurality of outputs of said decoder means and an output; and
a shift register having an input and an output and storage means for a plurality of digital words therebetween, responsive to said output of said presettable counter at said input and said shift register input of said presettable counter responsive to said output whereby said output of said presettable counter provides said count of said predetermined sample space configuration contained within said sample area.

6. A method for extracting data from an image contained within an array of binary data spaces comprising the steps of:
scanning said binary data spaces in a raster scan fashion;
forming an array of rectangular sample spaces each consisting of data spaces in adjacent rows and columns of said array;
accumulating a count in a counter of the total number of alike sample spaces in a sample area for each scan line of said raster scan, a sample area consisting of a predetermined multiplicity of sample spaces;
transferring said accumulated count from said counter to a storage means after said scan line has completely traversed all of said sample spaces in a sample area, said storage means providing an output total when said accumulated count is transferred;
storing said total in said storage means in such a manner that said transferred count and said output total are from adjacent sample areas along the direction of said scan;
feeding back said output total of said storage means to said counter, when a given sample area is about to be scanned by a scan line, said output total being the accumulated count over all previous scan lines for said given sample area; and
transferring the count accumulated by said counter to a digital computer after a given sample area has been completely scanned.

7. The method of claim 6 wherein said step of forming an array of sample spaces comprises the steps of:
storing data from a previous scan of data spaces in a storage means such that data entered into said storage means and exited therefrom, as a result of said data entry, are from adjacent data spaces of the instant and previous scans respectively;
delaying said entered data and said exited data one data space interval; and
combining said entered data, said exited data, said delayed entered data and said delayed exited data to form a sample space of adjacent rows and columns.

* * * * *